United States Patent Office 2,720,974
Patented Oct. 18, 1955

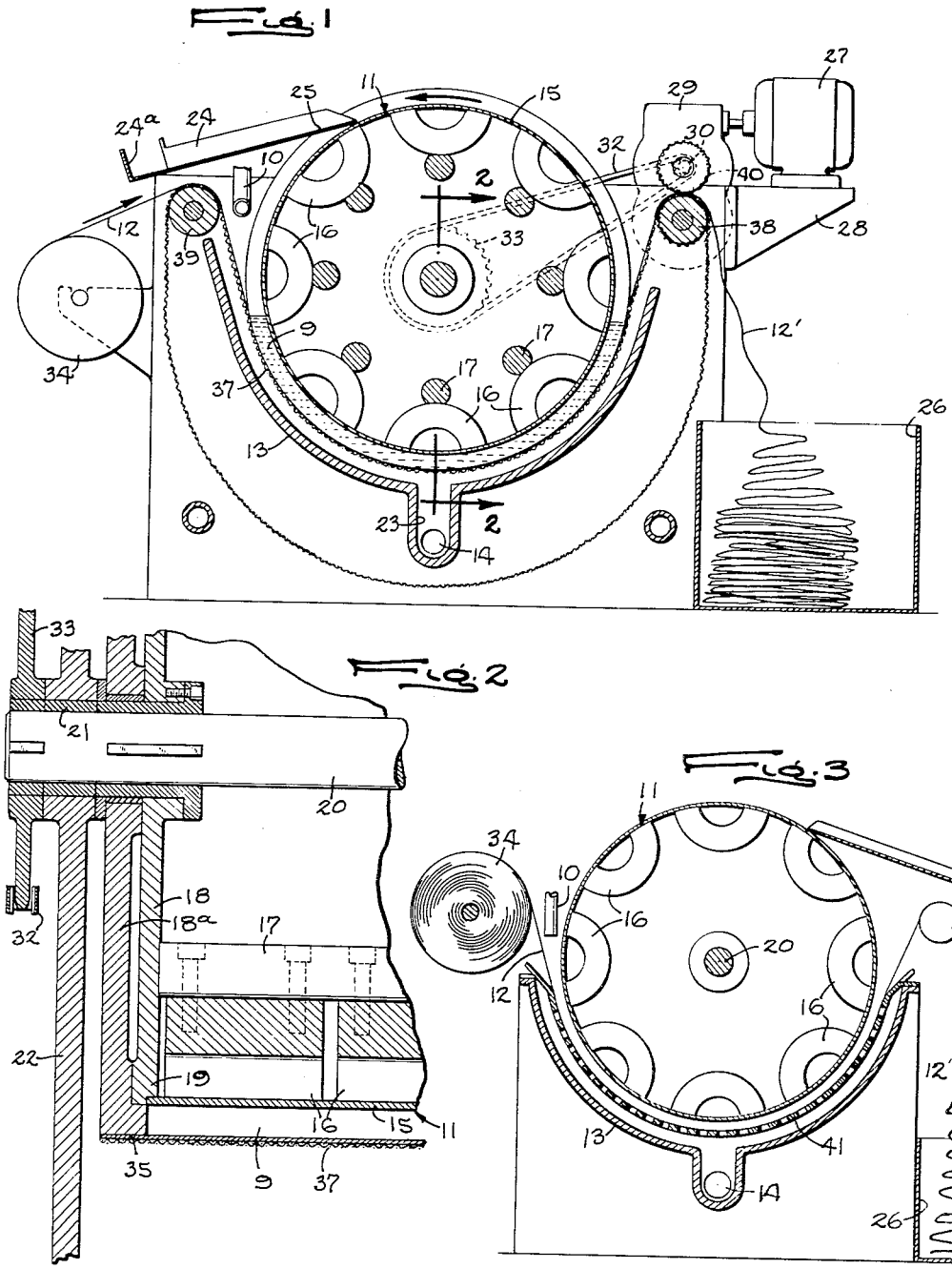

2,720,974

COMBINED SEPARATOR AND FILTER

Leslie L. Fowler, Rockford, Ill., assignor to Barnes Drill Co., Rockford, Ill., a corporation of Illinois Application January 3, 1955, Serial No. 479,557

4 Claims. (Cl. 210—1.5)

This invention relates to a combined machine for treating a liquid media to separate the magnetic solids by attraction thereof to a rotating drum and to remove the remaining solids by straining the liquid through a filter sheet adapted to be advanced endwise through the filtering area.

One object is to arrange a magnetic drum and filter sheet in a novel nested relation not only to provide overall compactness but also to achieve efficient filtering and magnetic separating actions.

A more detailed object is to mount the filter sheet for endwise movement in a curved path disposed below and extending around and adjacent the lower portion of the magnetic drum.

The invention also resides in the novel manner of supporting the filter media and advancing the same through the filtering area.

Other objects and advantages of the invention will become apparent from the following detailed description taken in connection with the accompanying drawings, in which Figure 1 is a vertical sectional view of a combined separator and filter embodying the novel features of the present invention.

Fig. 2 is a fragmentary section taken along the line 2—2 of Fig. 1.

Fig. 3 is a view similar to Fig. 1 showing a modified form of the invention.

In the combined separating and filtering machine shown in the drawings for purposes of illustration, the liquid from which magnetic and nonmagnetic particles or solids are to be removed is delivered through a suitable inlet such as a pipe 10 and exposed to the surface of a magnetic separator drum 11 as well as being confined in a pool 9 above a sheet 12 of filter material disposed above a tank 13 in which the filtered liquid accumulates and escapes through a bottom outlet 14. The drum 11 is of the type commonly used in magnetic separators and comprises a cylindrical nonmagnetic shell 15 surrounding the outwardly facing poles of magnets 16 spaced along and around the shell and suitably supported by cross rods 17 which are bridging end disks 18.

Opposite ends of the drum are pressed onto opposed hubs 19 of the disks which are spaced along and fast on a shaft 20 whose projecting ends are journaled in bearings 21 on the upstanding end walls 22 of the tank frame 13. Herein, the bottom of the tank is of arcuate shape and is spaced below and curved around the bottom portion of the drum 11 substantially concentric with the latter. Preferably, the discharge outlet 14 communicates with a channel 23 in the lowermost part of the tank bottom.

The magnetic material or swarf attracted to the drum surface is scraped off from the latter by a blade 25 pressed against a downwardly moving part of the drum near the top thereof. The blade is at the upper end of a chute 24 which slopes downwardly and overhangs the tank or communicates with a cross-chute 24a so that the swarf is delivered downwardly by gravity and discharged into a collection receptacle (not shown) beyond one side of the tank.

As viewed in Fig. 1, the drum is turned counterclockwise and at a suitable speed by a motor 27 mounted on a bracket 28 on the tank frame and operating through speed reduction gearing in a box 29 to drive a shaft 30. Fast on one end of the latter is a sprocket operating through a chain 32 to drive a sprocket 33 on one projecting end of the drum shaft 20.

The filter sheet 12 which may be composed of suitable paper or cloth extends from a supply roll 34 downwardly and around the bottom of the drum and spans and is sealed against the outer peripheries 35 of disks 18a so as to cooperate with the latter in defining a pocket for receiving and maintaining the liquid pool 9 in an arcuate band-like shape so as to submerge the lower part of the magnetic drum. Preferably, the depressed portion of the filter sheet defining the bottom of the pool is supported by an endless movable conveyor 37 which, in the present instance, comprises a flexible screen or the like suspended between and extending around rollers 38 and 39 fast on shafts journaled in suitable bearings in opposite side walls of the tank and herein disposed somewhat above the upper edges of the curved bottom wall of the tank. The filter sheet extends from the supply roll 34 downwardly over the roll 39 around the bottom of the drum, upwardly and around the drive roll 38 and finally the sheet bearing the filtered out solids is led into a receptacle 26 outside of the tank. If desired, the roll 39 may float vertically and be drawn upwardly by suitable spring means to tension the conveyor around the disk peripheries and thus hold the margins of the filter sheet under sealing pressure required to maintain the pool.

Suitable means is provided for driving the roll 38 and if desired the roll 39 to advance the conveyor 37 continuously or intermittently as desired so as to renew the sheet within the filtering area before excessive clogging of the latter occurs. Where as in the form shown in Fig. 1, the scraper 25 is located so as to permit the drum 11 and the filter sheet to travel in the same direction indicated by the arrows, the motor 27 may provide the drive as by connecting the other end of the shaft 30 to the shaft of the drive roll 38 through suitable gears 40. If an intermittent drive is desirable, suitable means well known in the art may be employed including a clutch coupling arranged to be engaged and disengaged by a float or other device for detecting a condition of clogging of the then active part of the filter sheet.

The liquid to be filtered is delivered from the supply pipe 10 downwardly adjacent the roll 39 into the supply end of the arcuate pocket whose top is defined by the bottom surface of the drum and whose bottom is, in this instance, formed by the length of the filter sheet resting on that portion of the perforated conveyor or screen 37 which is suspended between the rolls 38 and 39 and is sealed against the peripheries of the disks 18a. The liquid thus supplied to the inlet end of the pool 9 passes through the flux fields produced by the magnets 16, the suspended particles of magnetic material thus being attracted to and held on the drum surface so as to be carried through the pool and upwardly out of the pool as the drum turns. The swarf thus removed is eventually scraped off from the drum by the blade 25 and slides down the chute 24.

During the magnetic separating action, the liquid in the pool is subjected to a filtering action, that is, is strained through the active portion of the filter sheet then forming the bottom of the pool. The nonmagnetic particles and any other solids not removed by the magnetic separating action are thus caught and retained on the upper surface of the filter sheet. The filtrate is caught in the tank 13 and drained out of the outlet 14. As the conveyor 37 is advanced as above described, the sheet with the filtered out material thereon is carried upwardly and out of the pool and lengths of the sheet are drawn from the supply roll 34 and brought into the active filtering area. The used sheet indicated at 12' is led upwardly over the drive roll 38 and allowed to accumulate in the waste receptacle 26.

With the magnetic separator and gravity filter constructed and arranged as above described, the liquid to be filtered is first subjected to the magnetic separating action and then is strained through the filter sheet. Both actions take place within a comparatively small arcuate space concentric with the drum by virtue of the close nesting of the separator and filter elements. A high degree of overall compactness is achieved while at the same time providing for removal of the magnetic particles at low cost. As a result, the floor space required and the consumption of the filter sheet are reduced to a minimum.

Where relatively strong filter material such as cloth is employed, it may be supported on a stationary and rigid plate 41 mounted as shown in Fig. 3 above the tank in the same nested relation with respect to the drum as the conveyor 37 above described. Suitable means well known in the art is provided for sealing the edges of the plate around the peripheries of the disks 18. In other respects, the modified arrangement is constructed and operates essentially the same as the preferred arrangement first described, corresponding parts being indicated by the same reference numerals.

I claim as my invention:

1. A combination magnetic separator and filter having, in combination, an elongated flexible sheet of filter material having an intermediate arcuate portion defining the bottom of a filter pocket, a cylindrical drum having alternating areas of opposite magnetic polarity on its periphery, means rotatably supporting said drum to turn about a horizontal axis above said pocket bottom with the drum partially nested therein to provide an opposite arcuate top for said pocket concentric with and spaced above the bottom, means for delivering liquid to be filtered into one edge of said pocket to bring the liquid into contact with said drum surface for attraction of magnetic particles thereto and with said sheet for straining out the remaining solid particles, a perforated support underlying and supporting said sheet for passing the liquid filtered therethrough, and mechanism for feeding said sheet endwise to bring new sections thereof into the bottom of said filter pocket.

2. A combination magnetic separator and filter having, in combination, an elongated flexible sheet of filter material having an intermediate depressed portion defining the bottom of a filter pocket, a cylindrical drum having alternating areas of opposite magnetic polarity on its periphery, means rotatably supporting said drum to turn about a horizontal axis above said pocket bottom with the drum partially nested therein to provide an opposite arcuate top for said pocket concentric with and spaced above the bottom, means for delivering liquid to be filtered into one edge of said pocket to bring the liquid into contact with said drum surface for attraction of magnetic particles thereto and with said sheet for straining out the remaining solid particles, an endless perforated flexible conveyor underlying and supporting said sheet and movable endwise therewith along the bottom of said pocket, and mechanism by which said sheet and conveyor may be advanced endwise to bring new areas thereof into the bottom of said filter pocket.

3. A combination magnetic separator and filter having, in combination, an elongated flexible sheet of filter material having an intermediate depressed portion defining the bottom of a filter pocket, a cylindrical drum nested in and spaced above said bottom and having alternating areas of opposite magnetic polarity on its periphery, means rotatably supporting said drum to turn about a horizontal axis, means for delivering liquid to be filtered into one edge of the pocket between said drum surface and said sheet, a perforated support underlying and supporting said sheet, and mechanism for feeding said sheet endwise to bring new sections thereof into the bottom of said filter pocket.

4. A combination magnetic separator and filter having, in combination, a cylindrical drum having alternating areas of opposite magnetic polarity on its periphery, means rotatably supporting said drum to turn about a horizontal axis, an elongated flexible filter sheet, a perforated element extending in an arc around the bottom of said drum and spaced below the latter to form therewith an arcuate band-like pocket for receiving liquid to be filtered, means for delivering said liquid into one edge of said pocket to bring the liquid into contact with said drum surface for attraction of magnetic particles thereto and with said sheet for straining out the remaining solid particles, and mechanism for advancing said sheet endwise to bring new sections thereof into the bottom of said filter pocket.

No references cited.